Jan. 2, 1945.   W. L. SEMON ET AL   2,366,361
PURIFICATION OF BUTADIENE
Filed Sept. 30, 1939
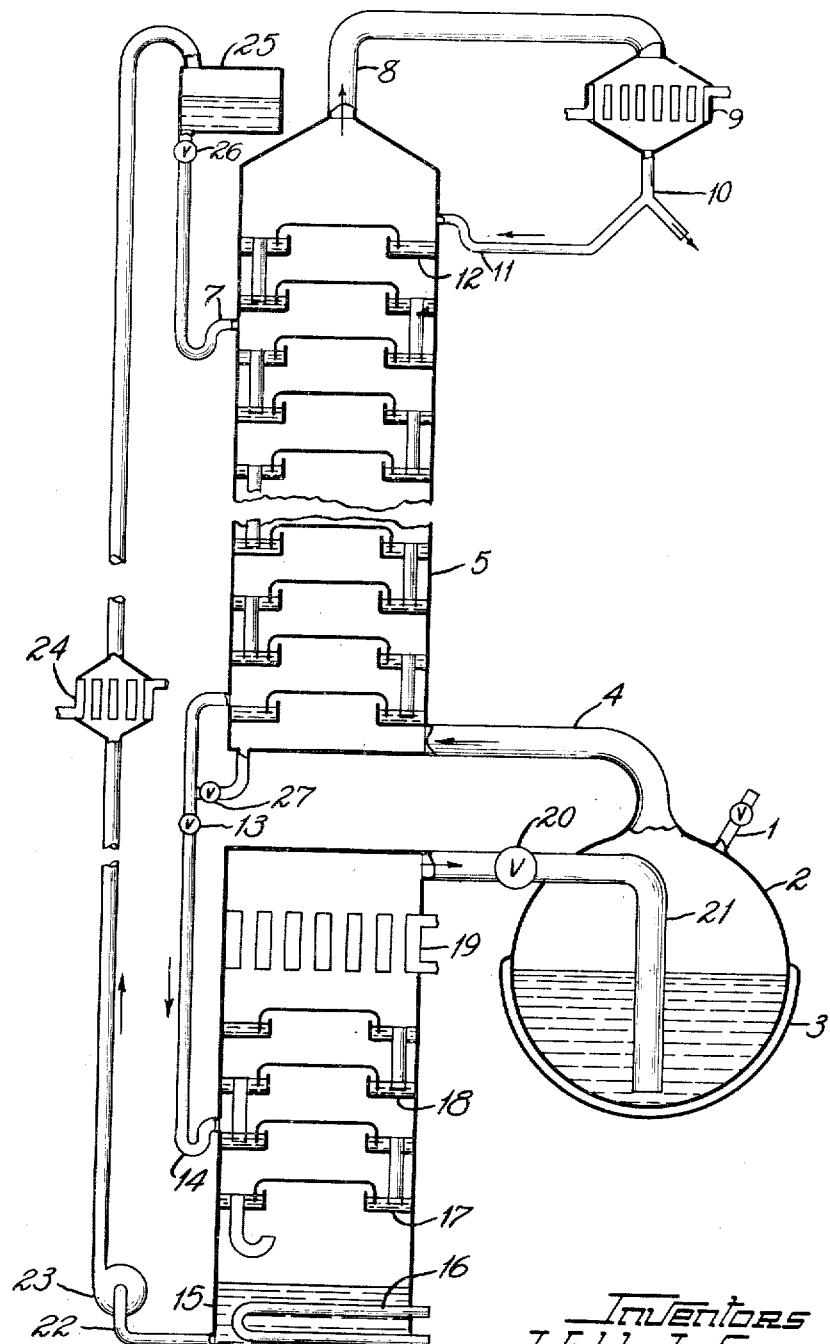
Inventors
Waldo L. Semon
David Craig
By Willis F. Avery
Atty Patented Jan. 2, 1945

2,366,361

UNITED STATES PATENT OFFICE 2,366,361

PURIFICATION OF BUTADIENE

Waldo L. Semon, Silver Lake, and David Craig, Cuyahoga Falls, Ohio, assignors to The B. F. Goodrich Company, New York, N. Y., a corporation of New York Application September 30, 1939, Serial No. 297,344

5 Claims. (Cl. 202—41)

This invention relates to separation of the components of substantially constant boiling mixtures and particularly to the separation of butadiene from butylene and butane.

It is known that butadiene can be enriched by distillation through a fractionating column down which flows a selective solvent for the butadiene. Processes of this kind which have been disclosed heretofore have all been continuous and have suffered from the inflexibility and necessity for meticulous control which characterize continuous distillations, but to a greatly enhanced degree, because the solvent introduces additional variables.

We have discovered that butadiene can readily be purified by selective extraction from vapors of crude butadiene, in a batch process, and that such a process avoids most of the difficulties encountered in continuous processes.

The continuous purification processes heretofore known resemble the batch process of this invention in some of the ways in which continuous fractional distillation resembles batch distillation, but in some respects exhibit fundamental differences.

We have discovered that significant enrichment of butadiene in admixture with butylene and butane cannot be accomplished unless ratio of rate of supply of solvent to rate of removal of impurities (butylene and butane) exceeds a critical value, analogous to the critical reflux ratio in ordinary fractionation. This ratio is a fairly large number (in the neighborhood of 10 to 20 in the case of some of the more useful selective solvents), hence the volume of solvent which must be handled is many times the volume of butadiene recovered. This means that if an ordinary type of batch still is employed, the still kettle must be large enough to contain not only the original charge but also the total volume of solvent, hence the true capacity of the still is a very small fraction of the volumetric capacity of the kettle. We have accordingly devised a preferred method and apparatus in which this inconvenience is avoided.

In the accompanying drawing one embodicommunicates with a fractionating column 5 wcally. The crude liquid butadiene is charged through an inlet 1 in kettle 2 which is provided with a temperature controlling means such as the jacket 3. The vapor outlet 4 of the kettle communicates with a fractionating column 5 which is preferably a bubble cap plate column containing at least fifteen plates and desirably twenty to thirty plates, although other types of columns equivalent to such a plate column may be used. A solvent inlet 7 is provided at or near the top of the column. At the top of the column a conduit 8 carries effluent vapors to a condenser 9, whence the condensed impurities are removed at 10. Optionally the condensate may be divided and a portion returned as reflux through a liquid seal 11 to the uppermost plate or plates 12 to scrub traces of solvent from the effluent vapors, but the reflux and the scrubbing plates can obviously be omitted if the solvent used is not appreciably volatile. The liquid reaching the bottom of the column passes through valve 13 and liquid seal 14 into a boiler 15 provided with heating means such as steam coil 16. One or more bubble cap plates 17 may be provided between the liquid seal 14 and the boiler 15 so that the solution flowing into the boiler can scrub out any solvent contained in the vapors from the boiler. Additional plates 18 and a dephlegmator 19 may be provided above the point of entrance of the solution through liquid seal 14, in order that refluxing condensate may scrub the last traces of solvent from the vapors. The dephlegmator 19 and plates 18 may be omitted if the solvent is only slightly volatile, and if it is substantially non-volatile even the plate 17 may be omitted. The vapors from the boiler 15 pass back to the kettle 2 through valve 20 and conduit 21, which preferably extends to the bottom of the kettle so that the vapors pass directly into the liquid therein. The bottom of the boiler 15 is connected through conduit 22, pump 23 and cooler 24 with a reservoir 25, whence the solvent is returned through valve 26 to the solvent inlet 7. A connection may also be provided for returning liquid from the bottom of the fractionating column 5 to the kettle 2 through a valve and auxiliary connection 27, which is normally kept closed.

In operation of the apparatus, the kettle 2 may be nearly filled with crude butadiene. A selective solvent for butadiene is started flowing down the column from reservoir 25 and is recirculated by pump 23, and the kettle is warmed by means of the jacket 3 to start distillation. The solvent, descending countercurrent to the ascending vapors, preferentially dissolves butadiene from the vapors, which progressively become leaner in this constituent as they approach the top of the column, whence they are finally removed. The butadiene is stripped from the solvent in the boiler 15 and returned to the batch in the kettle 2.

To attain a satisfactory separation, the solvent should be one which has a satisfactory selectivity for the butadiene, and the ratio of rate of supply of solvent to rate of removal of impurities should exceed the critical value heretofore mentioned. Suitable solvents are liquids which dissolve moderate proportions of butadiene at the temperature and pressure used, and which preferably contain multiple bonds between carbon atoms or between a carbon and another atom; including organic halogen compounds, alcohols, ethers, aldehydes, ketones, esters, amines, amides, nitriles, nitro compounds, and the like such as ethylene dichloride, chlorhydrin, dichlorether, methanol, butenol, acetaldehyde, crotonaldehyde, ethyl-hexenal, acetone, mesityl oxide, glycol diacetate, aniline, formamide, acetonitrile, nitrobutane, nitrobenzene, etc. Hydrocarbons are not very selective although some unsaturated hydrocarbons such as styrene give fairly good results. Those materials which are not very good solvents for butadiene should be employed at low temperatures or at increased pressures in order to reduce the volume of solvent required to dissolve the butadiene, while materials which dissolve butadiene very readily should be employed at higher temperatures or lower pressures to reduce the solubility of the hydrocarbon vapors and thus maintain the maximum selectivity. For example, furfural which has only a limited solubility for butadiene gives best results at about 1° C. at atmospheric pressure, but mesityl oxide gives good separation at 10° C., whereas ethylene dichloride does not show satisfactory selectivity until its temperature is raised to about 30° C. These temperatures can readily be regulated through the cooler 24. The critical ratio of rate of supply of solvent to removal of impurities is about 12 for furfural at 1° C. and about 15 for mesityl oxide at 10° C., during the initial stages of the separation of a mixture containing about 50% butadiene. At the end of the separation, when the butadiene concentration is higher, the critical ratio may increase somewhat, hence an operating ratio somewhat greater, say about 20, should be selected, or the ratio may be increased as the separation progresses.

When circulation of the solvent and boiling of the crude butadiene are established, heat is supplied through the coil 16 to boil dissolved butadiene out of the solvent. It is not necessary that the butadiene be completely eliminated, since the solvent is continuously recirculated, but it is desirable that as much as possible be boiled out, to prevent loss of some of the residual butadiene from the top of the column along with the vapors of the impurities. It is also not essential that the butadiene vapor be completely separated from solvent vapors in the boiler, so long as the volume of solvent accompanying the butadiene does not appreciably exceed the volume of impurities removed, but again a sharp separation is desirable because it reduces the labor of finally isolating the butadiene. The heat supplied through the coil 16 is therefore regulated to strip the solvent as completely as possible without driving solvent vapors beyond the plates 17 and 18. The temperature of the contents of the kettle 2 is then regulated by circulation of fluid through the jacket 3 to maintain a rate of boiling which will cause impurities to issue at 10 at the proper rate relative to the rate of solvent circulation.

In the preferred process, the vapors from the kettle, ascending the column, saturate the descending solvent, and are progressively deprived of their butadiene content by continuous interchange with the saturated solution. At the top of the column the vapors consist almost entirely of impurities and are condensed, a portion being returned as reflux to the scrubbing plate 12 to prevent solvent losses, and the remainder being withdrawn. The solvent at the bottom of the column is saturated with a mixture slightly richer in butadiene than the vapors issuing from the kettle. The solvent is stripped by boiling and is separated from the mixture under treatment by the plates 17 and 18, the stripped solvent being cooled and recirculated. The vapors stripped from the solvent are reintroduced into the batch in the kettle and furnish part of the heat for distilling the batch.

After most of the impurities have been eliminated it is advantageous to reduce the rate of distillation to obtain as sharp a separation as possible. When the butadiene content of the efflux begins to rise an intermediate fraction (which may be returned to the next batch) is taken, and when it approaches the desired concentration, the operation is interrupted. The kettle 2 will then contain almost pure butadiene, which may be distilled if desired, either in the same or in other apparatus, to separate it from any traces of solvent which may have been carried into it. If the butadiene is to be distilled in the same apparatus it is only necessary to stop the flow of solvent by closing the valve 26, isolate the kettle and fractionating column from the stripping column by closing the valves 13 and 20, provide for the return of reflux to the kettle by opening valve 27, and continue the operation as an ordinary fractional distillation.

In actual practice a mixture of butane, butylene and butadiene containing about 60% butadiene is separated by means of an apparatus such as is described above, with 30 bubble cap plates in the separating column, using mesityl oxide at 10° C. as the solvent and a ratio of solvent flow to removal of impurities of about 20, into a mixture of impurities containing from 2 to 5% butadiene and amounting to about 30% of the mixture, an intermediate fraction (including the "holdup" on the plates) amounting to somewhat over 15% of the mixture, and a residue in the kettle of 95% butadiene amounting to about 50% of the original mixture.

We claim:

1. A batch method of purifying butadiene mixed with other hydrocarbons of similar boiling point, which comprises distilling a batch of the mixed liquid hydrocarbons, passing the vapors through a fractionating column countercurrent to a liquid, relatively non-volatile, selective solvent for butadiene at such a rate that the ratio of rate of supply of solvent to rate of withdrawal of unwanted hydrocarbons from the head of the column exceeds the critical value, separating from the solvent which has passed down the column the hydrocarbons dissolved therein, and withdrawing the stripped solvent and returning the hydrocarbons separated from the solvent to the original batch, until the hydrocarbons other than butadiene are substantially eliminated from the batch.

2. A batch method of purifying butadiene mixed with other hydrocarbons of similar boiling point, which comprises distilling a batch of the mixed liquid hydrocarbons, passing the vapors through a fractionating column countercurrent to a liquid, relatively non-volatile, selective solvent for butadiene at such a rate that the ratio of rate of supply of solvent to rate of withdrawal of unwanted hydrocarbons from the head of the column exceeds the critical value, heating the solvent which has passed down the column to boil out the hydrocarbons dissolved therein, and withdrawing the stripped solvent and returning the hydrocarbons thus separated from the solvent to the original batch, until the hydrocarbons other than butadiene are substantially eliminated from the batch.

3. A batch method of purifying butadiene mixed with other hydrocarbons of similar boiling point, which comprises distilling a batch of the mixed liquid hydrocarbons, passing the vapors through a fractionating column countercurrent to a liquid, relatively non-volatile, selective solvent for butadiene at such a rate that the ratio of rate of supply of solvent to rate of withdrawal of unwanted hydrocarbons from the head of the column exceeds the critical value, heating the solvent which has passed down the column to boil out the hydrocarbons dissolved therein, and withdrawing the stripped solvent and returning the hydrocarbon vapors thus separated from the solvent to the original batch under its liquid surface, until the hydrocarbons other than butadiene are substantially eliminated from the batch.

4. A batch method of purifying butadiene mixed with other hydrocarbons of similar boiling point, which comprises distilling a batch of the mixed liquid hydrocarbons, passing the vapors through a fractionating column countercurrent to a liquid, relatively non-volatile, selective solvent for butadiene at such a rate that the ratio of rate of supply of solvent to rate of withdrawal of unwanted hydrocarbons from the head of the column exceeds the critical value, heating the solvent which has passed down the column to boil out the hydrocarbons dissolved therein, passing vapors boiled from the solvent in countercurrent contact with solution flowing from the column to deprive the vapors of their solvent content, and withdrawing the stripped solvent and returning the hydrocarbon vapors thus separated from the solvent to the original batch under its liquid surface, until the hydrocarbons other than butadiene are substantially eliminated from the batch.

5. The method of claim 4 in which the stripped solvent is cooled and recirculated through the column.

DAVID CRAIG.
WALDO L. SEMON.

CERTIFICATE OF CORRECTION.

Patent No. 2,366,361. January 2, 1945.

WALDO L. SEMON, ET AL.

It is hereby certified that error appears in the printed specification of the above numbered patent requiring correction as follows: Page 1, first column, lines 46 to 48 inclusive, for "drawing one embodi- communicates with a fractionating column 5 w cally" read --drawing one embodiment of the apparatus is shown diagrammatically--; and that the said Letters Patent should be read with this correction therein that the same may conform to the record of the case in the Patent Office.

Signed and sealed this 15th day of May, A. D. 1945.

Leslie Frazer (Seal) Acting Commissioner of Patents.

rate of supply of solvent to rate of withdrawal of unwanted hydrocarbons from the head of the column exceeds the critical value, heating the solvent which has passed down the column to boil out the hydrocarbons dissolved therein, and withdrawing the stripped solvent and returning the hydrocarbons thus separated from the solvent to the original batch, until the hydrocarbons other than butadiene are substantially eliminated from the batch.

3. A batch method of purifying butadiene mixed with other hydrocarbons of similar boiling point, which comprises distilling a batch of the mixed liquid hydrocarbons, passing the vapors through a fractionating column countercurrent to a liquid, relatively non-volatile, selective solvent for butadiene at such a rate that the ratio of rate of supply of solvent to rate of withdrawal of unwanted hydrocarbons from the head of the column exceeds the critical value, heating the solvent which has passed down the column to boil out the hydrocarbons dissolved therein, and withdrawing the stripped solvent and returning the hydrocarbon vapors thus separated from the solvent to the original batch under its liquid surface, until the hydrocarbons other than butadiene are substantially eliminated from the batch.

4. A batch method of purifying butadiene mixed with other hydrocarbons of similar boiling point, which comprises distilling a batch of the mixed liquid hydrocarbons, passing the vapors through a fractionating column countercurrent to a liquid, relatively non-volatile, selective solvent for butadiene at such a rate that the ratio of rate of supply of solvent to rate of withdrawal of unwanted hydrocarbons from the head of the column exceeds the critical value, heating the solvent which has passed down the column to boil out the hydrocarbons dissolved therein, passing vapors boiled from the solvent in countercurrent contact with solution flowing from the column to deprive the vapors of their solvent content, and withdrawing the stripped solvent and returning the hydrocarbon vapors thus separated from the solvent to the original batch under its liquid surface, until the hydrocarbons other than butadiene are substantially eliminated from the batch.

5. The method of claim 4 in which the stripped solvent is cooled and recirculated through the column.

DAVID CRAIG.
WALDO L. SEMON.

CERTIFICATE OF CORRECTION.

Patent No. 2,366,361. January 2, 1945.

WALDO L. SEMON, ET AL.

It is hereby certified that error appears in the printed specification of the above numbered patent requiring correction as follows: Page 1, first column, lines 46 to 48 inclusive, for "drawing one embodi- communicates with a fractionating column 5 w cally" read --drawing one embodiment of the apparatus is shown diagrammatically--; and that the said Letters Patent should be read with this correction therein that the same may conform to the record of the case in the Patent Office.

Signed and sealed this 15th day of May, A. D. 1945.

Leslie Frazer (Seal)                    Acting Commissioner of Patents.